United States Patent
Xu et al.

(10) Patent No.: US 12,218,897 B2
(45) Date of Patent: Feb. 4, 2025

(54) AUTOMATED TRANSFORMATION OF EMAIL SIGNATURES

(71) Applicant: Citrix Systems, Inc., Fort Lauderdale, FL (US)

(72) Inventors: Sai Xu, Nanjing (CN); Xin Liu, Nanjing (CN); Yimin Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/809,150

(22) Filed: Jun. 27, 2022

(65) Prior Publication Data

US 2023/0412542 A1    Dec. 21, 2023

Related U.S. Application Data

(63) Continuation of application No. PCT/CN2022/099459, filed on Jun. 17, 2022.

(51) Int. Cl.
*H04L 51/07* (2022.01)
*H04L 51/21* (2022.01)
*H04L 51/42* (2022.01)

(52) U.S. Cl.
CPC ........... *H04L 51/07* (2022.05); *H04L 51/21* (2022.05); *H04L 51/42* (2022.05)

(58) Field of Classification Search
CPC ......... H04L 51/07; H04L 51/42; H04L 51/21; H04L 41/026; H04L 51/063; H04L 51/066; H04L 51/214; G06F 40/40
USPC ........................................................ 709/206
See application file for complete search history.

(56) References Cited

U.S. PATENT DOCUMENTS

| | | | |
|---|---|---|---|
| 6,816,884 B1 * | 11/2004 | Summers ................ | H04L 51/48 709/228 |
| 7,865,562 B2 * | 1/2011 | Nesbitt ................ | G06Q 10/107 709/206 |
| 8,301,894 B2 * | 10/2012 | Malkin .................. | G06F 21/64 713/180 |
| 9,444,776 B2 * | 9/2016 | Albouyeh ............... | H04L 51/52 |
| 9,710,242 B1 * | 7/2017 | Peermohammed ....... | G06F 8/41 |
| 11,586,940 B2 * | 2/2023 | Allen ....................... | G06N 5/04 |

(Continued)

FOREIGN PATENT DOCUMENTS

| | | |
|---|---|---|
| CN | 103514156 A | 1/2014 |
| JP | 2004200937 A | 7/2004 |

(Continued)

OTHER PUBLICATIONS

International Search Report and Written Opinion for International Application No. PCT/CN2022/099459 dated Dec. 16, 2022.

*Primary Examiner* — Sargon N Nano

(57) ABSTRACT

A system and method for dynamically transforming email signatures. A method includes: receiving an email from an email client prior to delivery to an intended recipient, the email including an original signature; analyzing the email to obtain information associated with the intended recipient of the email; predicting a preferred language of the intended recipient based on the information; converting the original signature to a revised signature, wherein the revised signature utilizes the preferred language; and forwarding the email with the revised signature to the intended recipient.

16 Claims, 6 Drawing Sheets

(56) References Cited

U.S. PATENT DOCUMENTS

| | | | | |
|---|---|---|---|---|
| 2002/0188670 A1* | 12/2002 | Stringham | G06Q 10/107 | 704/5 |
| 2006/0277153 A1* | 12/2006 | Mason | G06F 16/258 | |
| 2008/0040435 A1* | 2/2008 | Buschi | G06Q 10/107 | 709/206 |
| 2008/0249760 A1* | 10/2008 | Marcu | G06F 40/58 | 704/2 |
| 2009/0183006 A1* | 7/2009 | Malkin | H04L 9/3247 | 713/176 |
| 2010/0286977 A1* | 11/2010 | Chin | G06Q 10/00 | 704/4 |
| 2011/0307241 A1* | 12/2011 | Waibel | G06F 40/44 | 704/2 |
| 2012/0209588 A1* | 8/2012 | Wu | G06F 40/42 | 704/2 |
| 2013/0238312 A1* | 9/2013 | Waibel | G06F 40/117 | 704/8 |
| 2014/0213224 A1* | 7/2014 | Woodring | H04M 3/53333 | 379/88.05 |
| 2014/0303961 A1* | 10/2014 | Leydon | G06F 40/51 | 704/2 |
| 2016/0041969 A1* | 2/2016 | Oonishi | G06F 40/58 | 704/2 |
| 2016/0191448 A1* | 6/2016 | Eck | H04L 51/52 | 709/206 |
| 2016/0255490 A1* | 9/2016 | Mufti | H04W 60/04 | 370/328 |
| 2017/0048181 A1* | 2/2017 | Gupta | H04L 51/063 | |
| 2017/0161364 A1* | 6/2017 | Clark | H04L 67/306 | |
| 2018/0300316 A1* | 10/2018 | Chissoe | G10L 15/26 | |
| 2020/0265113 A1* | 8/2020 | Dubey | G06F 40/103 | |
| 2020/0304313 A1* | 9/2020 | Choudhury | H04L 9/3247 | |
| 2020/0387573 A1* | 12/2020 | Bellrose | G06F 40/30 | |
| 2023/0418566 A1* | 12/2023 | Athiwaratkun | G06F 11/3608 | |
| 2024/0160862 A1* | 5/2024 | Kim | G06F 40/253 | |

FOREIGN PATENT DOCUMENTS

| | | | | |
|---|---|---|---|---|
| WO | WO-2004042603 A2 * | 5/2004 | | G06F 17/275 |
| WO | WO-2006127965 A2 * | 11/2006 | | G06F 17/289 |
| WO | WO-2007098012 A1 * | 8/2007 | | G06F 17/289 |
| WO | 2010/062540 A1 | 6/2010 | | |
| WO | 2021/179048 A1 | 9/2021 | | |

* cited by examiner

AUTOMATED TRANSFORMATION OF EMAIL SIGNATURES

BACKGROUND OF THE DISCLOSURE

Email remains a preferred platform for electronic communications and is often utilized by users in different geographic regions, where cultural and languages differences can exist. To provide at least a baseline of understanding between an email sender and a receiver, the sender typically includes a preset signature at the end of their email that provides the sender's contact and personalized information.

BRIEF DESCRIPTION OF THE DISCLOSURE

Aspects of this disclosure include a system and method for automatically transforming email signatures of a sending user to align with language and other preferences of an intended recipient.

A first aspect of the disclosure provides a system that includes a memory and a processor coupled to the memory and configured to dynamically transform email signature data according to a process. The process includes receiving an email from an email client prior to delivery, wherein the email includes an original signature. Analyzing the email to obtain information associated with an intended recipient of the email and predicting a preferred language of the intended recipient based on the information. Converting the original signature to a revised signature, wherein the revised signature utilizes the preferred language, and forwarding the email with the revised signature to the intended recipient.

A second aspect of the disclosure provides a method of dynamically transforming email signature data. The method includes receiving an email from an email client prior to delivery to an intended recipient, the email including an original signature. Analyzing the email to obtain information associated with the intended recipient of the email and predicting a preferred language of the intended recipient based on the information. Converting the original signature to a revised signature, wherein the revised signature utilizes the preferred language, and forwarding the email with the revised signature to the intended recipient.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of this disclosure provide technical solutions for dynamically transforming email signatures. In certain embodiments, a language or other aspects of a sender's email signature is automatically converted to a receiver's language, i.e., a "localized language," and/or preferences. While prior solutions allow users to store and select different signature files for different email messages, the user must manually select a desired signature file. Furthermore, when sending a group email, current solutions do not allow for different signatures to be used for different recipients. In addition, because signature information is often embedded in a picture (e.g., a JPEG), translation tools do not provide an effective solution.

Figure 1:
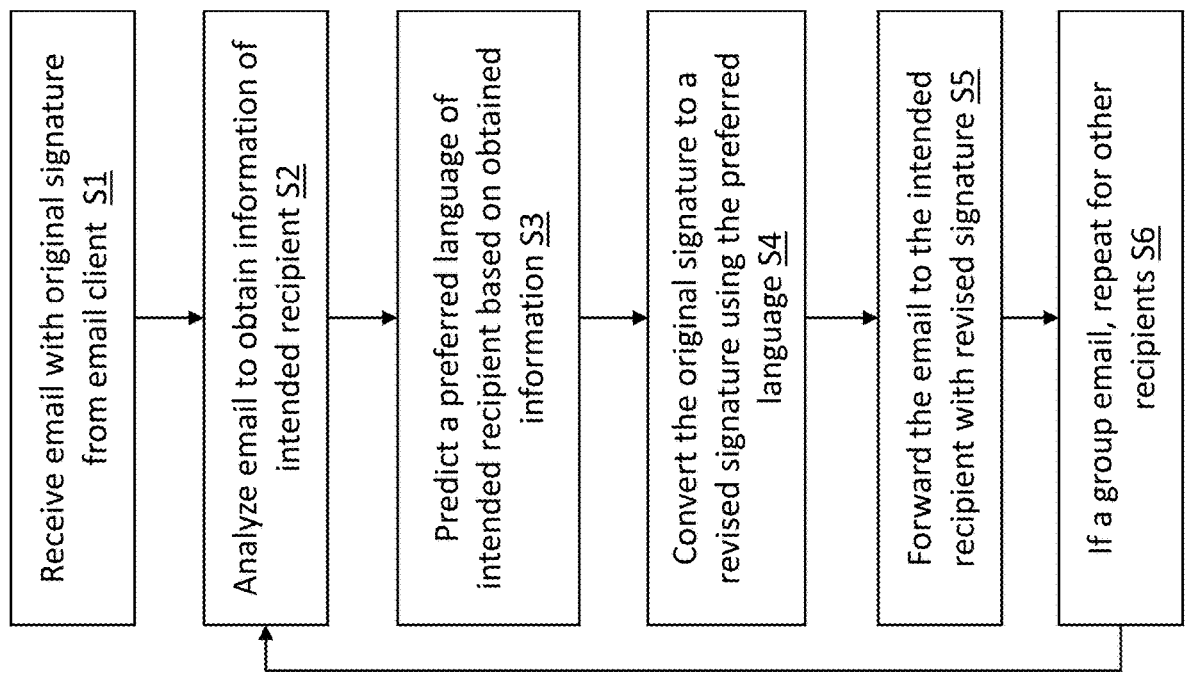
FIG. 1 depicts a flow diagram of a process for automatically transforming an email signature, in accordance with an illustrative embodiment.

In the present approach, emails are processed by a signature management service that interfaces with a mail gateway (or other delivery agent of a mail server) to transform signature files before the email is delivered. Transformation generally includes replacing an original email signature with either a stored signature or an automatically generated signature. FIG. 1 depicts a flow diagram of a general overview of an illustrative process. At 51, an email with an original signature is received at an email server from an email client (i.e., a sending user). At S2, a signature management service analyzes the email to obtain information about an intended recipient, and at S3, a preferred language (and/or other preferences) of the intended recipient is predicted based on the obtained information. At S4, the original signature is converted to a revised signature using the preferred language (and/or other preferences) and at S5 the email is forwarded to the intended recipient with the revised signature. At S6, if the email is a group email (i.e., has more than one intended recipient), the process is repeated for each intended recipient.

Figure 2:
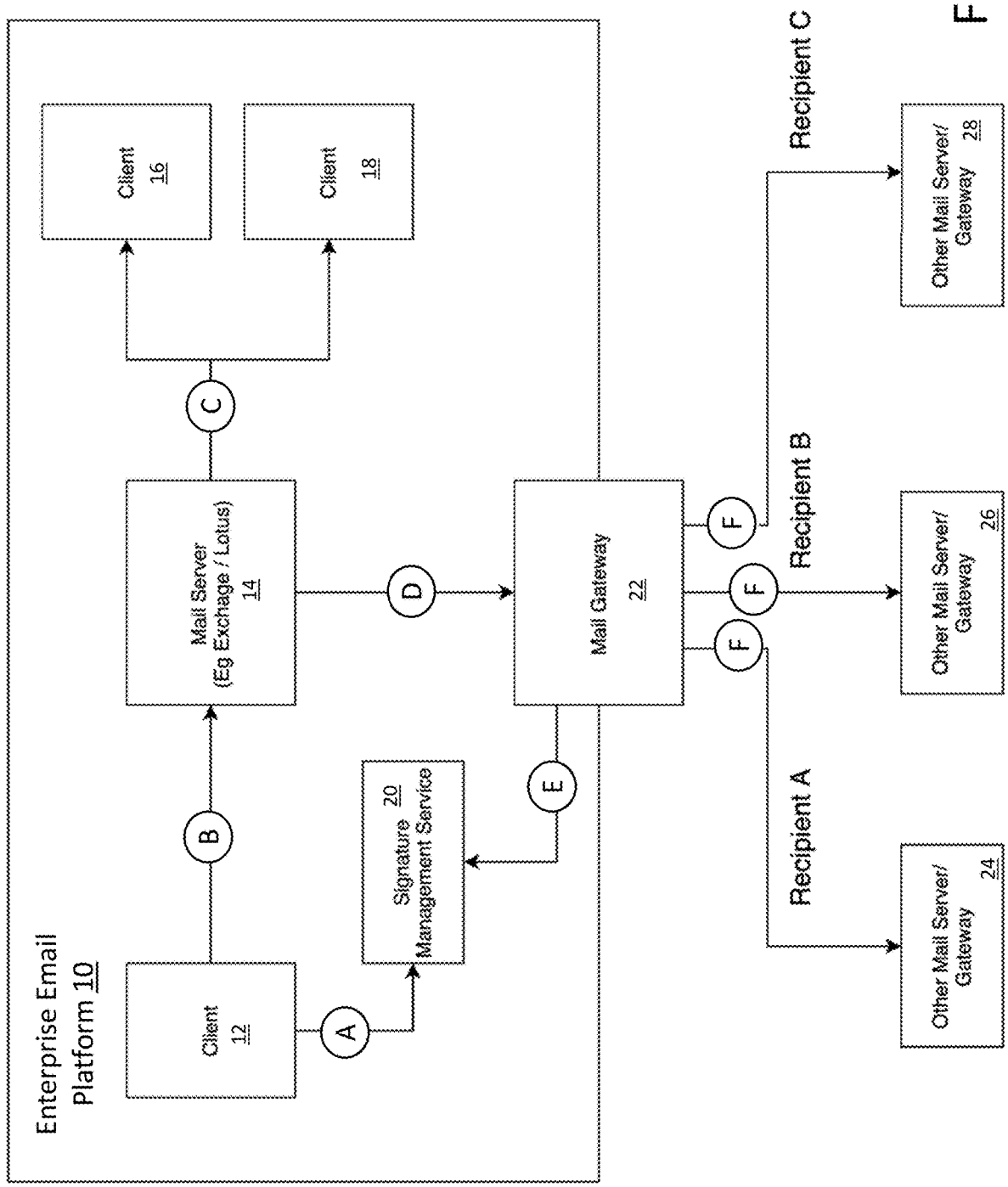
FIG. 2 depict an illustrative enterprise mail platform for automatically transforming email signatures, in accordance with an illustrative embodiment.

FIG. 2 depicts an illustrative enterprise email platform 10 configured to perform automated signature transformation according to an illustrative embodiment. In this example, platform 10 includes a sending email client 12, a mail server 14, a mail gateway 22 and a signature management service 20. In this example, emails can be directed to: (1) receiving email clients 16 and 18 that are within the platform 10 (i.e., the same company or organization) and do not require a mail gateway 22 to deliver emails; and/or (2) external recipients (i.e., Recipients A, B, C) via mail gateway 22 and other mail server/gateways 24, 26, 28.

The following describes an illustrative workflow for processing an email having an original email signature. In the following example, the original email signature comprises a default email signature included by default with all emails sent by a user. However, the process could apply to any signature included in an email by the user. In this example, a user associated with client 12 stores their default signature and one or more localized signatures with the signature management service 20 at step A. Localized signatures generally include different preset versions of the default email signature in different languages and/or formats.

At step B, the user creates and sends an email via the mail server 14 to one or more recipients. For those recipients that are in the enterprise, the mail server will deliver the mail directly, e.g., to clients 16 and 18, without altering the default signature at step C. For those recipients that are out of the enterprise, the mail server 14 will deliver the mail to the mail gateway 22 at step D. Once received at the mail gateway 22, each recipient will be processed using functionality provided by the mail gateway 22 and signature management service 20 to determine if the signature in mail should be replaced by an appropriate localized signature at step E. Finally, the mail gateway 22 delivers updated version(s) of the email, with localized signatures where appropriate to the mail servers 24, 26, 28 of the intended recipients.

Note that in this embodiment, internal email directed to clients 16, 18 is not processed by the signature management service 20. However, it is understood the solution could be configured to apply to internal emails as well as external emails. Furthermore, while the platform 10 is described using a mail gateway 22, it is understood that the platform 10 could instead utilized a mail server plugin or other agent to perform the same functions.

Figure 3:
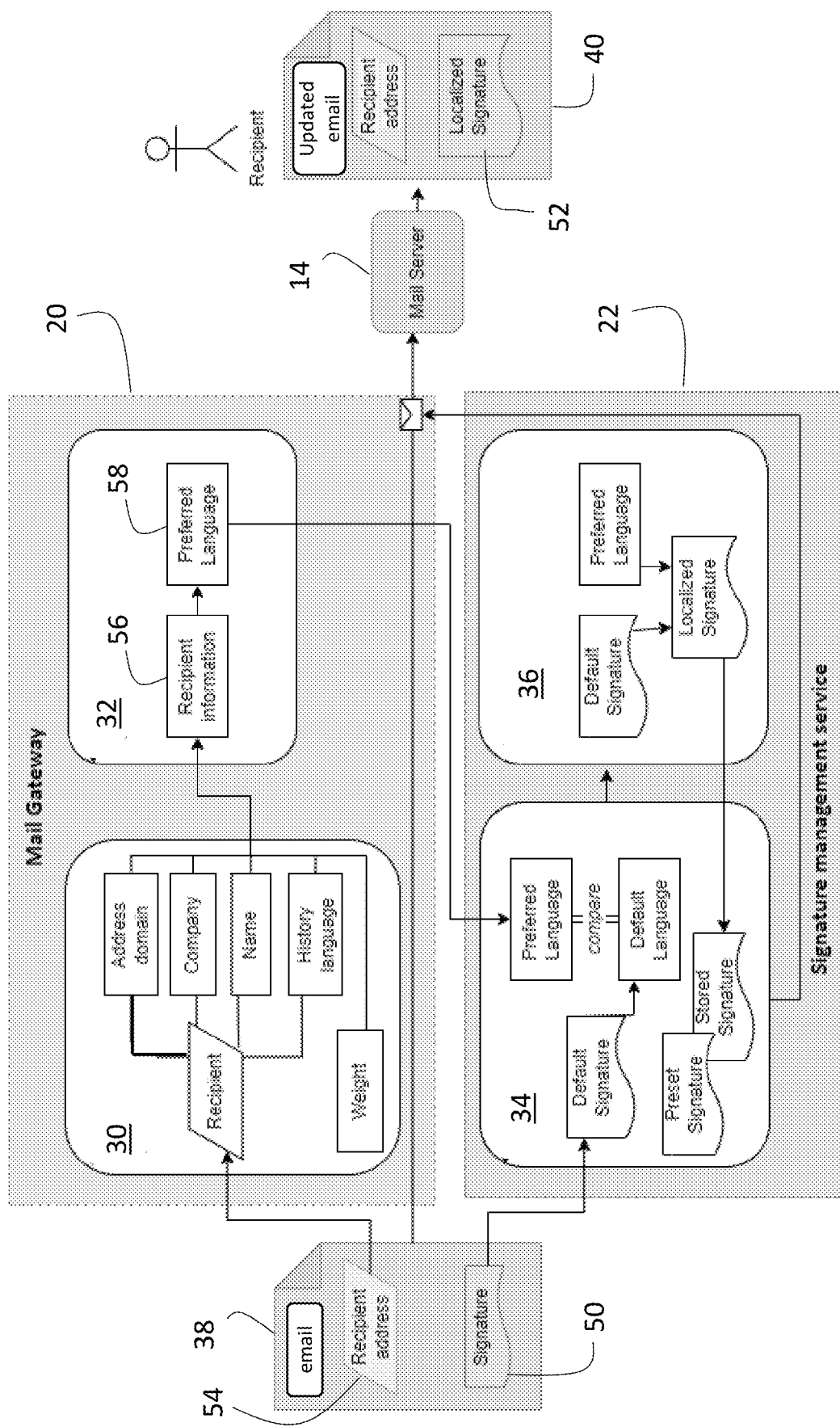
FIG. 3 depicts a system for processing emails, in accordance with an illustrative embodiment.

FIG. 3 depicts illustrative implementation details of mail gateway 20 and signature management service 22 configured to generate an updated email 40 with a revised, i.e., localized, signature 52 from an email 28 having a default (i.e., original) signature 50. In this embodiment, email 38 is submitted by a user for delivery and includes at least one recipient address 54 that is processed by the mail gateway 20 and a default signature 50 that is processed by the signature management service 22.

Mail gateway 20 includes a recipient information acquisition module 30 that evaluates the recipient address 45 and generates a set of recipient information 56, which is processed by a language inference module 32 to predict (i.e., infer) a preferred language 58 of the recipient. In one illustrative embodiment, recipient information acquisition module 30 evaluates the recipient address 54 to determine a domain and enterprise (e.g., company) of the email address, the recipient's name, and statistics on the languages used by recipient in historical messages (if existing). Module 30 also maintains a weight value of each of these information elements. The weights can be, e.g., configured by a user or implemented as system default values. In one illustrative approach, the following information elements are defined:

L(D): language of the domain to which the address belongs;
L(C): language of the company to which the address belongs;
L(N): The language inferred from the user's email name;
L(H): language used by recipient in historical messages; and
W(D), W(C), W(N) and W(H) are the weight values assigned to each element.

The information elements are provided to language inference module 32, which is responsible for calculating the recipient's preferred language. In one approach, a check is first made to determine if there are duplicate languages in the list of {L(D), L(C), L(N), L(H)}, and if so their weights are summed. Next, the languages are sorted by the weight values {W(D), W(C), W(N), W(H)}, with the highest result being the preferred language. The preferred language is forwarded to signature processing module 34 to determine if the original signature 50 needs to be converted. In alternative embodiments, the preferred language can be determined using other approaches, such as with a machine learning model that analyzes both the recipient address and other information gathered from the body of the email (e.g., references to time zones, locations, etc.).

In one approach, signature management module 34 stores localized versions (i.e., different languages) of the default signature 50 for each user within an enterprise. Localized versions may be preset (e.g., edited and stored) by the user or be generated by localized signature generator module 36 in previous (or the current) mail sending process. When an email 38 is being sent, the default signature 50 is captured by the signature management module 34 for the sending user, which is saved along with a default language of the sending user. The default language can be ascertained by analyzing the default signature, e.g., using natural language processing techniques. The preferred language 58 of the recipient, from the language inference module 32, is then compared to the default language. If they are the same, the default signature 50 is not changed. If they are different, then a localized signature using the preferred language is obtained from the stored preset signatures and replaces the default signature, e.g., using an automated editing tool. If no localized signature exists for the preferred language, localized signature generator module 36 can generate and store a new localized signature using an automated translation process.

Note that because it may be difficult to ensure accuracy of an automated translation process, in certain embodiments, automated translation may only be allowed if there is no preset or stored version in the preferred language, and the sending user has opted in advance to enable automatic translations, e.g., in a feature of the email client. If enabled, localized signature generator module 36 automatically translates the user's default signature to the preferred language. This process may include text machine translation, time and date format conversion, Unicode character optimization, image text recognition conversion and other globalization processing. Automated translating may include transforming formatting if necessary (e.g., revising a logo, HTML link, or JPEG image).

Figure 4:
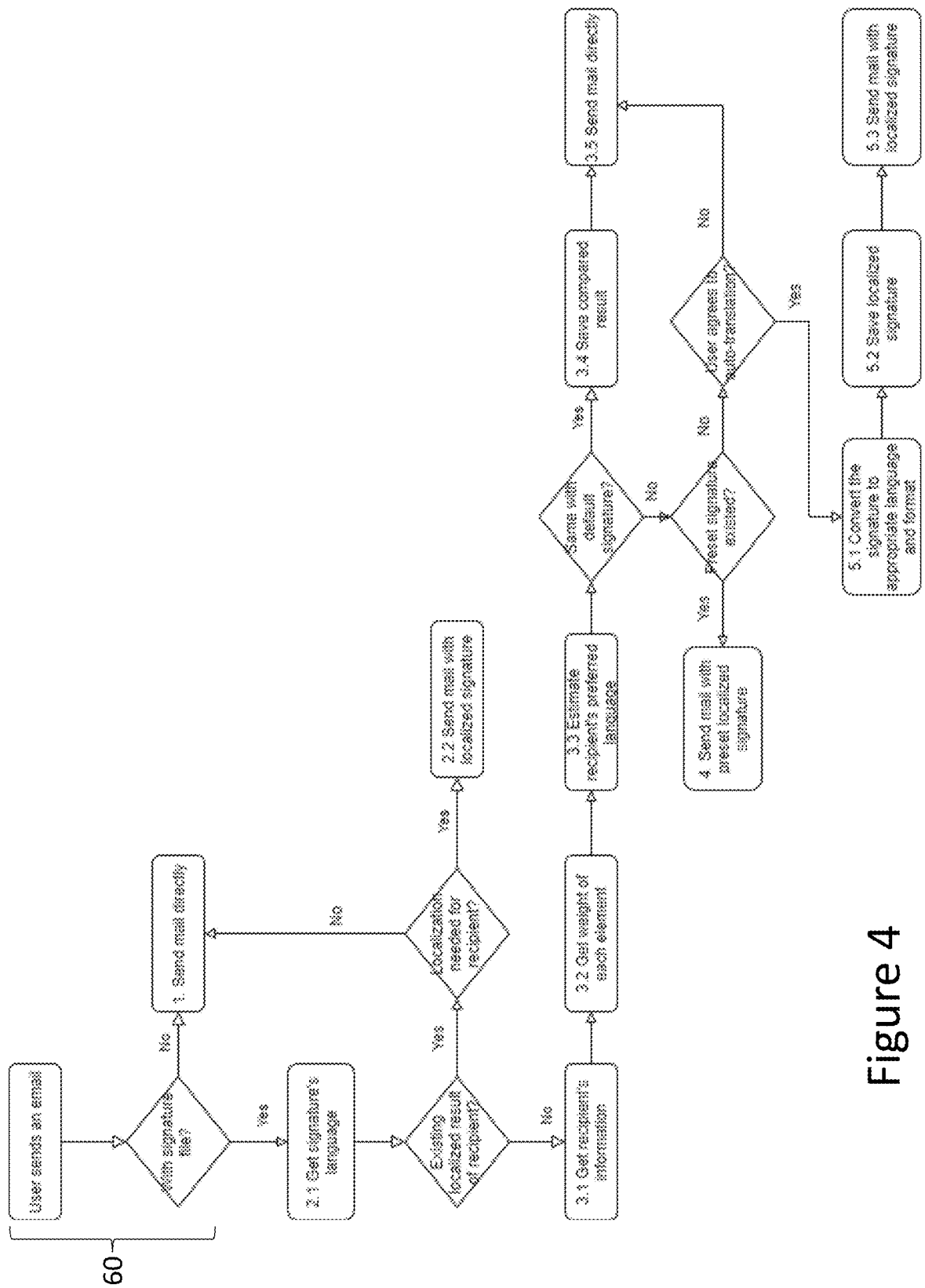
FIG. 4 depicts a flow diagram for processing emails, in accordance with an illustrative embodiment.

FIG. 4 depicts a detailed process flow illustrating five scenarios for transforming email signatures with reference to FIG. 3. Initially, at 60, a user sends an email and a determination is made whether the email includes a signature file.

1. In scenario 1, if no signature file is included, then the email is directly sent without modification.
2. In scenario 2, if a signature file exists, then:
    2.1. The signature processing module 34 analyzes the signature to determine a default language of the signature, e.g., using a third-party application programming interface (API) such as GOOGLE Translation. If there is an existing localize signature stored for the intended recipient in the recipient's preferred language, a determination is made whether localization is needed for the recipient, i.e., the preferred language is different from the default language. If they are not different, the email is directly sent with no alteration.
    2.2. If the default language is different from the preferred language (and a localized signature with the preferred language exists), then the email is sent with the localized signature.
3. In scenario 3, if there is no existing localized signature stored for the recipient, then:
    3.1. The recipient information acquisition module 30 obtains the recipients information (e.g., based on the recipient's email address and historical information),
    3.2. The recipient information acquisition module 30 applies weights for each informational element, and
    3.3. Language inference module 32 estimates (i.e., predicts) the recipients preferred language.

3.4. If the preferred language is same as the signature's default language, the result is saved to signature processing module 34, and 3.5. The original email is directly sent with the default signature 50.

4. In scenario 4, if there the preferred language is different from the default language following 3.3, then a determination is made whether a preset signature exists in the preferred language. If yes, then the email is sent with the preset localized signature 52 in place of the original signature 50. If no, then a determination is made whether the user agreed to (i.e., enabled) automated translations. If no enablement, the original email 38 is directly sent with the default signature 50.

5. In scenario 5, if there is not a preset localized signature in the preferred language and the user agrees to automated translations, then:

5.1 The localized signature generation module 36 converts the default signature 50 to the preferred language, 5.2 The newly generated localized signature is stored in the signature processing module 34 for use in future, and 5.3 The email is sent with the translated localized signature.

In addition to evaluating and predicting languages preferences of the intended recipient, the described solution could likewise be used to alter signature files based on other criteria. For example, the described solution could be utilized to predict a preferred formality style of the signature for the intended recipient based on information from historical information, the sender's email and/or the recipient's email address. For instance, based on a determined relationship type between a sender and intended recipient (e.g., friends, family, coworkers, clients, etc.) a preferred formality style of a signature file can be utilized (e.g., colloquial, collegial, highly formal, etc.).

Figure 5:
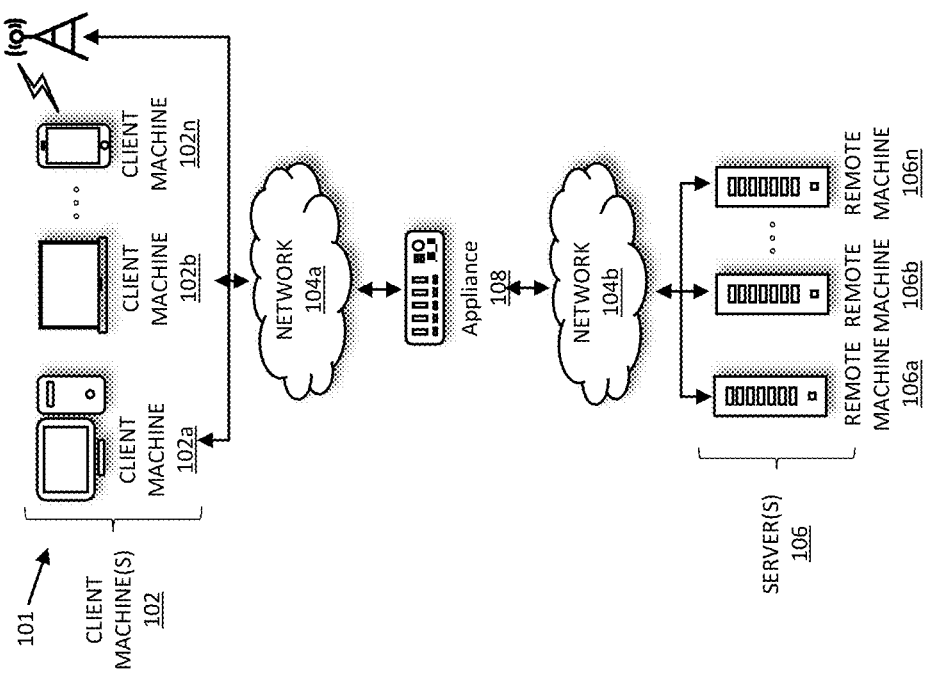
FIG. 5 a network infrastructure, in accordance with an illustrative embodiment.

It is understood that the described signature processing can be implemented using any computing technique, e.g., as a stand-alone system, a distributed system, within a network environment, etc. Referring to FIG. 5, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 6:
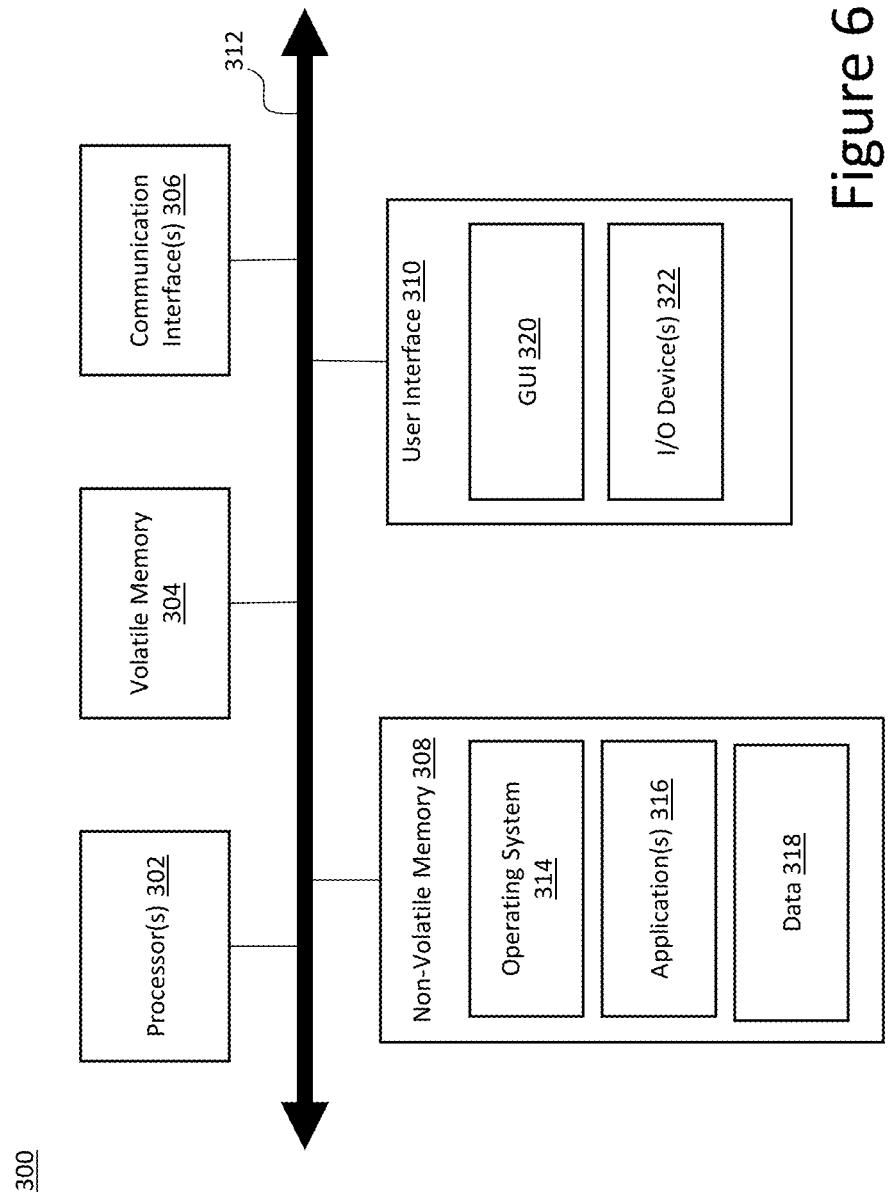
FIG. 6 depicts a computing system, in accordance with an illustrative embodiment.

Elements of the described solution may be embodied in a computing system, such as that shown in FIG. 6 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O)

devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The invention claimed is:

1. A system, comprising:
a memory; and
a processor coupled to the memory and configured to automatically transform email signature data according to a process that includes:

receiving an email from an email client prior to delivery;

determining whether the email includes an associated signature file having an original signature of a sender; and in response to determining that the email includes the associated signature file:

analyzing the email to obtain information associated with an intended recipient of the email;

predicting a preferred language of the intended recipient based on the information;

predicting a preferred formality style for the intended recipient using the information, wherein the preferred formality style is based on a relationship type between the sender and the intended recipient;

converting the original signature from the associated signature file to a revised signature, wherein the revised signature utilizes the preferred language and the preferred formality style; and forwarding the email with the revised signature to the intended recipient, wherein the revised signature of the sender is obtained from a set of stored preset signatures in different languages.

2. The system of claim 1, wherein the revised signature is dynamically generated by translating the original signature to the preferred language.

3. The system of claim 2, wherein translating the original signature to the preferred language occurs only if a sender of the email enabled an automated translation feature in the email client.

4. The system of claim 2, further comprising saving the revised signature to a set of stored signatures.

5. The system of claim 1, wherein the information associated with the intended recipient includes a set of information elements selected from a group comprising: a language associated with a domain of an intended recipient's email address; a language associated with a company to which the intended recipient's email address belongs; a language inferred from the intended recipient's email address; and a language used by the intended recipient in historical email messages.

6. The system of claim 5, wherein the information elements are weighted and evaluated to predict the preferred language.

7. The system of claim 1, further comprising: analyzing the email to determine a language of a sender; determining if the preferred language of the intended recipient matches the language of the sender; and in response to a match, using the original signature without performing the converting.

8. The system of claim 1, wherein the signature data is transformed at one of: an email gateway, an email server plugin, or a transport agent.

9. A method of dynamically transforming email signature data, comprising receiving an email from an email client prior to delivery to an intended recipient;

determining whether the email includes an original signature of a sender; and in response to determining that the email includes the original signature:

analyzing the email to obtain information associated with the intended recipient of the email;

predicting a preferred language of the intended recipient based on the information;

predicting a preferred formality style for the intended recipient using the information, wherein the preferred formality style is based on a relationship type between the sender and the intended recipient;

converting the original signature to a revised signature, wherein the revised signature utilizes the preferred language and the preferred formality style; and forwarding the email with the revised signature to the intended recipient, wherein the revised signature of the sender is obtained from a set of stored preset signatures in different languages.

10. The method of claim 9, wherein the revised signature is dynamically generated by translating the original signature to the preferred language.

11. The method of claim 10, wherein translating the original signature to the preferred language occurs only if a sender of the email enabled an automated translation feature in the email client.

12. The method of claim 10, further comprising saving the revised signature to a set of stored signatures.

13. The method of claim 10, wherein the information associated with the intended recipient includes a set of information elements selected from a group comprising: a language associated with a domain of an intended recipient's email address; a language associated with a company to which the intended recipient's email address belongs; a language inferred from the intended recipient's email address; and a language used by the intended recipient in historical email messages.

14. The method of claim 13, wherein the information elements are weighted and evaluated to predict the preferred language.

15. The method of claim 9, further comprising: analyzing the email to determine a language of a sender; determining if the preferred language of the intended recipient matches the language of the sender; and in response to a match, using the original signature without performing the converting.

16. The method of claim 9, wherein the signature data is transformed at one of: an email gateway, an email server plugin, or a transport agent.

* * * * *